Oct. 8, 1968     F. B. BARTER ET AL     3,404,945
CONDITIONING APPARATUS AND INDICATOR CONTROL THEREFOR
Filed Aug. 29, 1963     3 Sheets-Sheet 1
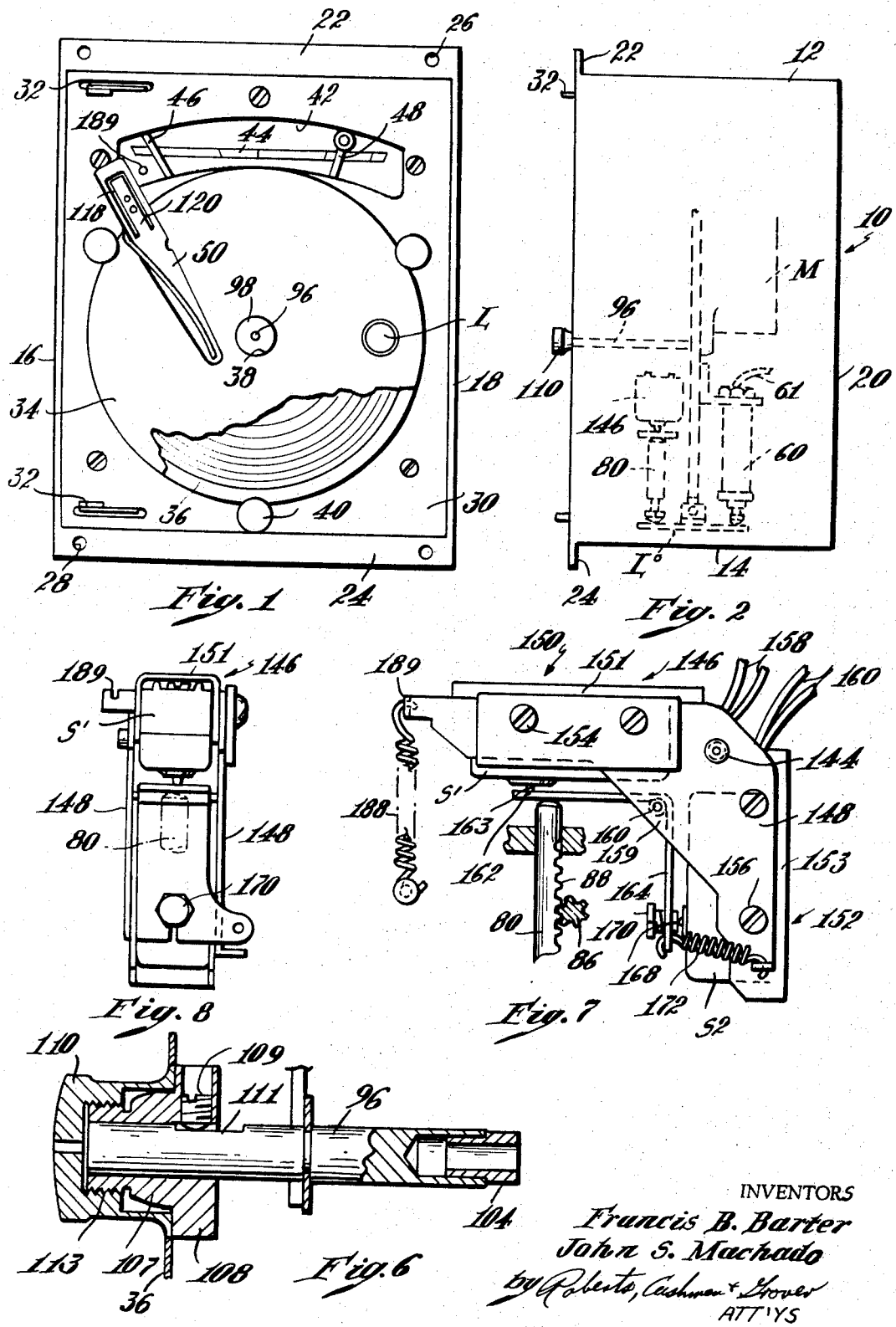
INVENTORS
Francis B. Barter
John S. Machado
by Roberts, Cushman & Grover
ATT'YS

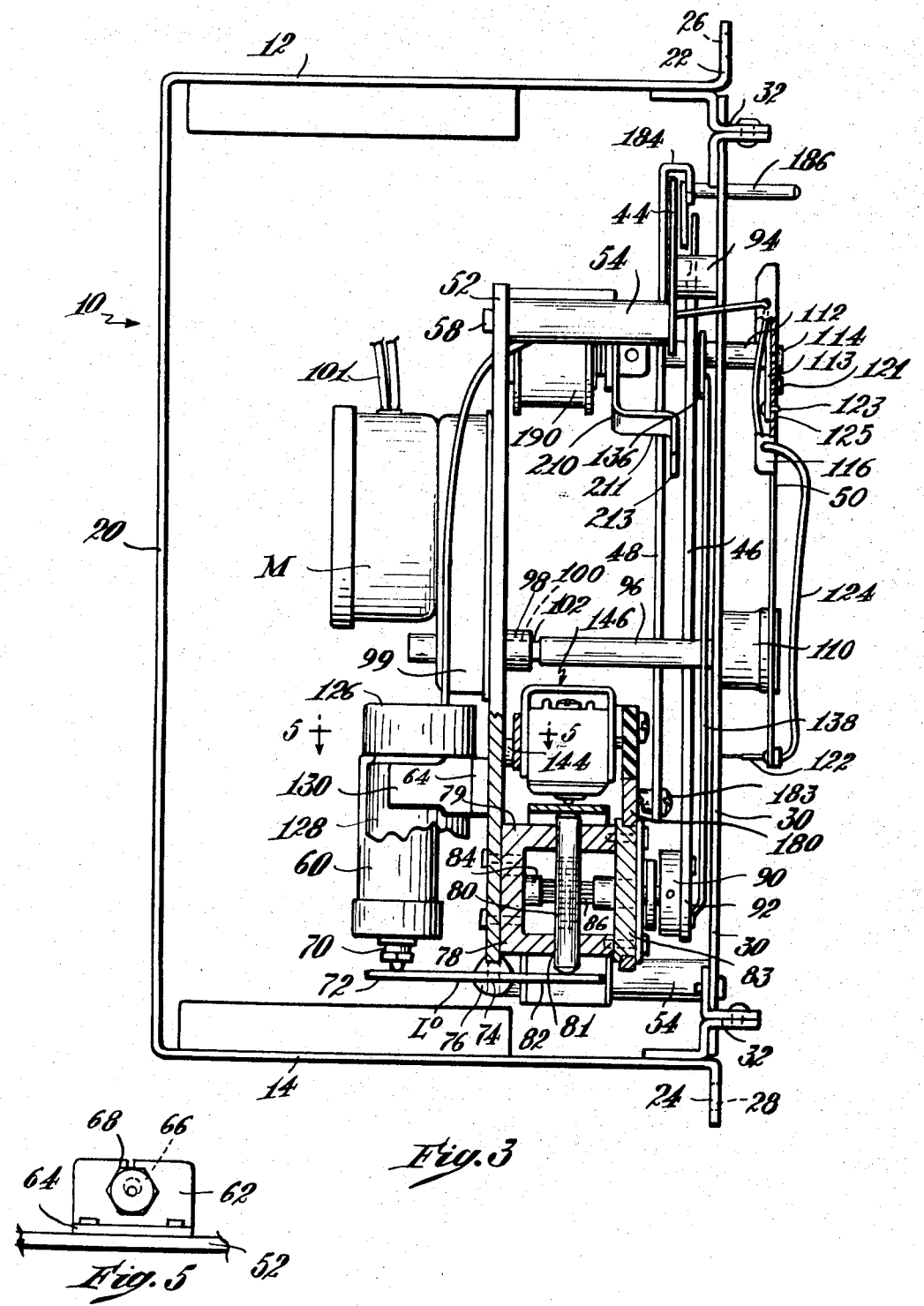

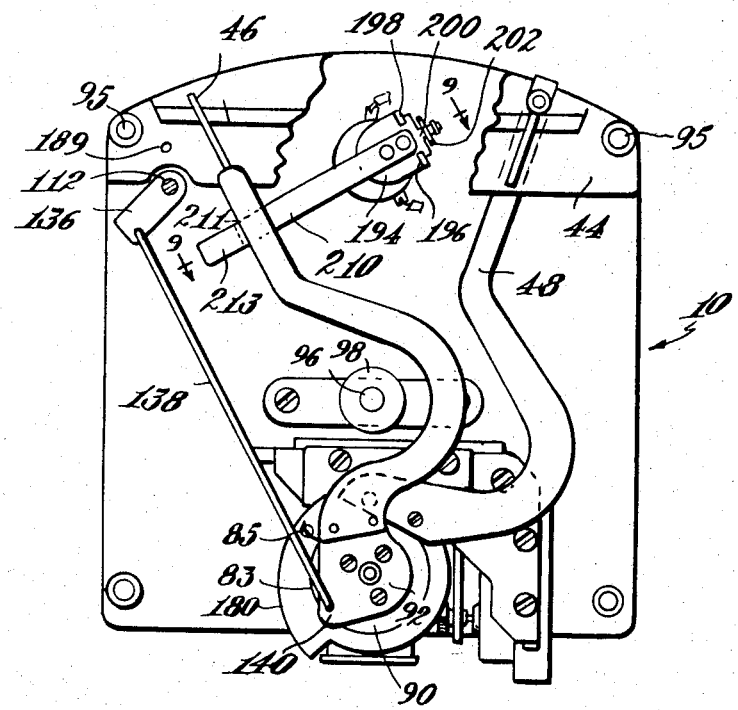
Fig. 4
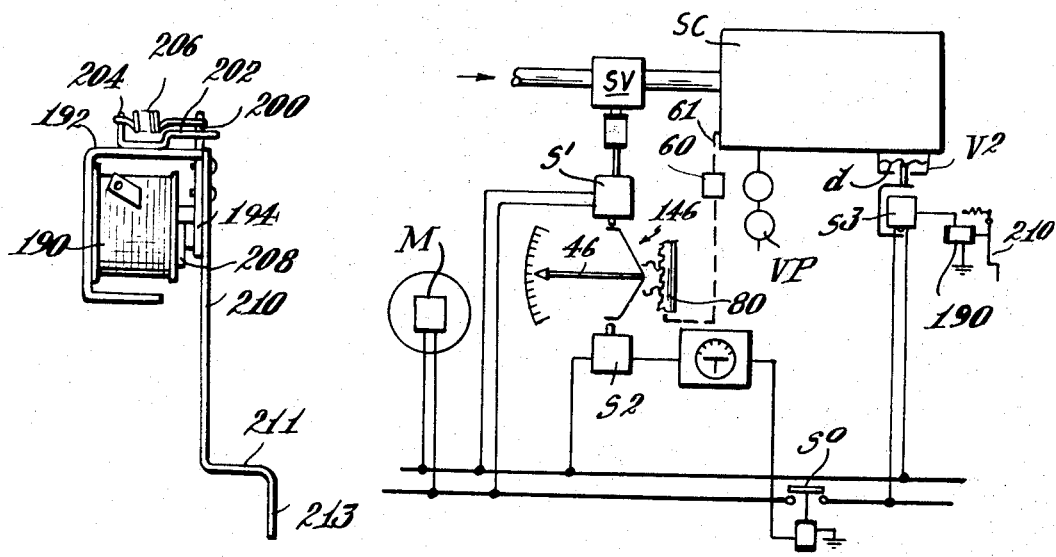
Fig. 9
Fig. 10

United States Patent Office  3,404,945
Patented Oct. 8, 1968

3,404,945
CONDITIONING APPARATUS AND INDICATOR
CONTROL THEREFOR
Francis B. Barter, Westwood, and John S. Machado, Woburn, Mass., assignors to United Electric Controls Company, Watertown, Mass., a corporation of Massachusetts
Filed Aug. 29, 1963, Ser. No. 305,323
4 Claims. (Cl. 21—93)

ABSTRACT OF THE DISCLOSURE

Sterilizing apparatus, operation of which is desirably initiated from a predetermined initial condition, and indicator means operable, in addition to controlling the progress of the operation, to make a distinctive mark on a chart indicative of the fact that the apparatus was returned to said predetermined condition prior to initiating the next operation. The indicator means employed is of the kind disclosed in United States Patent No. 3,144,771, issued Aug. 18, 1964.

---

It is desirable to substantially completely evacuate a sterilizing chamber prior to introducing the sterilizing medium and initiating the heating cycle, and the principal object of this invention is to provide an indicator which will visually assure the operator or user of the apparatus, prior to commencement of the sterilizing cycle, that the sterilizing chamber was evacuated the desired amount. It is to be understood, however, that such means is equally useful for indicating other conditions of the sterilizing apparatus or of other apparatus desirable or necessary prior to the commencement of an operation.

As herein illustrated, the foregoing is accomplished by means of a recorder having a scale, an indicator movable along the scale in response to the progress of the operation, and means positionable between the lower end of the scale and the indicator, following movement of the indicator up the scale during any given operation, to intercept the return movement of the indicator to hold it away from the lower end of the scale, said means being operative, by satisfying the condition desired at the beginning of the next operation of the apparatus, to permit the indicator to return to said lower end and, by such movement, to visibly show that said condition has been satisfied. Preferably a permanent record of the satisfaction of the condition is desired and, to this end, a chart is provided with a scriber and the indicator is operably connected to the scriber so as to cause the scriber to draw a line on the chart showing the return of the scriber to the low or zero end of the scale in response to satisfaction of the condition desired. More especially, the apparatus, as here illustrated, is employed in conjunction with a sterilizing chamber which must be substantially completely evacuated prior to injection of the sterilizing medium and initiation of the heating cycle. The means for holding the indicator away from the zero position is an arm urged into intercepting position by a spring. When the evacuation is completed a pressure-sensitive element pulses a relay which, in turn, momentarily retracts the arm so as to release the indicator whereupon the latter is moved back to the zero position by a spring. Preferably the arm is only momentarily withdrawn and immediately released so that it reengages the indicator as the latter moves by it so as to restrain its fall and hence to prevent bounce or damage. To effect positive stopping of the indicator the arm has a part perpendicular to it which is projected across the path of movement of the indicator and a part parallel which is frictionally engaged with the indicator. The sterilizing chamber is provided with a vacuum pump by means of which it is evacuated and a pressure-sensitive element operative, when the vacuum is attained, to effect operation of the arm. A steam valve is provided to introduce steam to the sterilizing chamber, a timer is provided for controlling the length of the sterilizing period, and the timer is manually set and operates to energize a pair of switches, one of which initiates operation of the timer and the other of which controls opening and closing of the steam valve. The temperature-responsive element, when the predetermined high temperature is reached, actuates the switch which starts the timer and the switch which closes the steam valve, and will oscillate between the two to maintain the temperature constant for the entire period of sterilization whereupon the main switch will be opened by the timer.

The invention will now be described in greater detail with reference to the accompanying drawings wherein:
FIG. 1 is a front view of the indicator;
FIG. 2 is a side elevation, as seen from the right side of FIG. 1, showing some of the parts interiorly thereof in dot-and-dash lines;
FIG. 3 is a section from top to bottom, as seen from the left-hand side of FIG. 1, to larger scale, with parts in elevation and with parts in section;
FIG. 4 is a front elevation of the back panel removed from the instrument, showing parts of the operative mechanism supported thereon;
FIG. 5 is a section taken on the line 5—5 of FIG. 3, showing the adjustable support for the thermally-responsive motor;
FIG. 6 is an elevation of the shaft by means of which the chart is rotated, removed from the instrument, and to much larger scale;
FIG. 7 is an elevation of a rocker for supporting a pair of switches internally of the instrument;
FIG. 8 is an elevation as seen from the left-hand side of FIG. 7;
FIG. 9 is an elevation of an interceptor arm and means for effecting its movement into and out of position; and
FIG. 10 diagrammatically illustrates the association of the instrument with a sterilizing chamber for effecting control of the latter.

Referring to the drawings, the recorder has a substantially rectangular hollow housing 10 provided with top and bottom walls 12 and 14, side walls 16 and 18, and a back wall 20, the housing being open at the front and of sufficient depth to receive the operative mechanism, as will be described hereinafter. Right-angularly disposed flanges 22 and 24 are formed integral with the front edges of the top and bottom walls which contain openings 26 and 28, by means of which the housing may be secured to a suitable support. The open front side of the housing is provided with a door 30 supported within the opening, substantially flush with the edges of the wall by hinges 32, so that the door can be swung to an open position to expose the interior of the housing without providing room for such openings at the hinge side of the door. A key-operated lock L provides for securing the door closed to prevent unauthorized tampering.

The door has substantially centrally of its front face a circular recess 34 adapted to accommodate a chart 36, only a part of which is shown in FIG. 1 and at the center of the depression there is a circular opening 38 through which projects, as will appear hereinafter, a drive shaft for turning the chart. To maintain the chart flat, a plurality of tongues 40 are struck up from the metal of the door peripherally of the recess, parallel to the bottom thereof, so as to overlie the peripheral edge of the chart when the latter is disposed within the recess. Above the recess there is a transversely disposed arcuate opening 42 through which there is visible a scale 44 provided with graduations marked off in degrees Fahrenheit and along which are adapted to be moved an index element 46 and a positioning element 48. A pen arm 50 is mounted on the outer face of the door 30, adjacent the left-hand end of the opening 42, for drawing on the chart the variations in temperature corresponding to the movement of the indicator 46.

The door 30 supports rearwardly thereof, within the housing (FIG. 3), a base plate 52, the latter being held in spaced parallel relation to the door by a plurality of rigid posts 54 disposed between them and secured at their ends by screw bolts 58. Four of these posts are shown herein.

A thermal motor 60 is mounted on the rear side of the base plate 52 by means of a bracket member 62 (FIG. 5) projecting rearwardly from the base plate, the bracket having a flange 64 provided with openings for receiving bolts by means of which it is screwed to the base plate. The thermal motor 60 is adjustably secured to the bracket 62 by means of an eccentric cylindrical extension 66 at its upper end which is rotatably mounted in a circular opening in the bracket 62, so that, by rotation of the extension in the plate, the axis of the motor 60, which is parallel to the base plate, may be moved relative thereto. The upper end of the extension is threaded for receiving a nut 68 which may be screwed against the top of the bracket 62 to hold the motor in a given position of adjustment.

The motor contains a rod 70 which is movable downwardly (FIG. 3), by displacement of a displaceable element within it. The protruding end of the rod 70 has contact with one arm 72 of a two-arm lever Lo pivotally mounted on a rod 74, the latter being secured at its ends between a pair of spaced, downwardly projecting ears 76—76 secured to the lower edge of the base plate 52. A U-shaped bracket 78 is bolted to the base plate between the base plate and the door and has vertically spaced, parallel arms 79—79 containing aligned openings 81—81 which slidably receive a bar 80, the lower end of which rests on the other arm 82 of the lever Lo, so that downward movement of the rod 70 of the motor 60 will depress the arm 72, elevate the arm 82 and thus raise the bar 80. A plate 83 is bolted to the forward ends of the parallel arms 79—79 and a drive shaft 84 is journaled between the rear side of the bracket and the plate 83, with its forward end projecting through the plate 83. The shaft 84 has on it a pinion 86 which meshes with rack teeth 88 on the bar 80. Thus, rocking of the lever Lo by raising and lowering the bar 80 effects rotation of the drive shaft 84. A disc 90 is secured to the forwardly projecting end of the shaft 84 for rotation therewith and provides support for the lower end 92 of the index element 46, supporting the latter in an upright position parallel to the inner side of the door 30, with its upper end situated between the door 30 and the forward face of the scale plate 44. The supporting disc 90 at the lower end of the index element is adjustably secured to the disc in the same manner as disclosed in the aforementioned patent, to which reference may be had for the details so that further description of this feature is not necessary herein. As also shown in said patent, a coiled spring 85, secured at one end to the ring 180 coiled about the shaft 184, and secured at its other end thereto, yieldably holds the indicator against a stop pin 189 and operates to return the indicator to this position when displaced therefrom, as will appear hereinafter.

The scale plate 44 is secured in spaced parallel relation at the rear side of the door 30 at its ends by rigid spacer posts 94 and screw bolts 95 (FIG. 4) which pass through the door through the spacer posts 94 and the plate 44, the latter, in turn, being secured to the posts 54 by the screw bolts 58.

A drive shaft 96 for the chart is rotatably supported so as to project forwardly through the central opening 38 in the door in a bearing shaft 98, the latter being mounted on the base plate (FIG. 6) and having forwardly of the base plate a socket 100 within which is non-rotatably engaged a non-circular stem 102 secured in a socket 104 at the rear end of the shaft 96. The bearing shaft 98 extends through a gear reduction housing 99 secured to the rear side of the base plate and is driven through a train of gears therein by a synchronous motor M mounted on the gear reduction housing 99. The synchronous motor is provided with suitable leads 101 through which power is supplied. A hub 107 (FIG. 6), having a circular flange 108, is secured to the shaft 96 by a set screw 109 screwed through the flange against a flat 111 on the shaft. The forward end of the hub 107 is threaded at 113 for receiving a nut 110. The chart which is disposed in the recess at the outer side of the door has a circular opening at its center adapted to fit over the hub 107 so that the portion of the chart, marginally of the central opening, rests against the flange 108, and the nut 110, when screwed onto the hub, fixes the chart to the flange so that it rotates with the shaft 96.

The pen arm 50 (FIGS. 1 and 3) is supported by a stud shaft 112, rotatably fixed in the door adjacent the left-hand end of the opening 42 by means of a bracket 113 fixed to the outer end of the stud shaft by a screw bolt 114. The pen arm is comprised of sheet metal and has reinforcing flanges 116 (FIG. 3) along the edges at the proximal end and contains a U-shaped slot 118 (FIG. 1) which defines a panel 120. The panel 120 is non-rotatably secured to the bracket 113 by a screw bolt 121 inserted through an opening therein and screwed into the bracket 113, and a tit 123 extending from the bracket through an opening 125 in the panel. The mounting thus provides for flexibly supporting the pen arm parallel to the surface of the chart and permits lifting the distal end from the chart by pressure applied to the proximal end thereof. The distal end of the pen arm supports a stylus nib 122 for contact with the chart and is supplied with a writing fluid through a conductor 124 which extends therefrom rearwardly along the arm 50 through one of the flanges 116 to the underside of the arm along the rear side, again through the flange 116, through the door 30, the base plate 52, downwardly along the back of the base plate, and through a cap 126 screwed onto the upper end of a container 128 for writing fluid. The container is removably secured between a pair of resilient arms 130—130 fastened to the rear side of the base plate. A pressure conductor (not shown) is also connected through the cap 126 to permit application of pressure to the container so as to force the writing fluid therefrom to the writing nib.

The pen arm 50 is caused to move on the chart to record the movement of the indicator 46 on the scale 44 to provide a permanent record by connection to the indicator. This is effected by an arm 136 (FIG. 4) secured to the stub shaft 112 and a rod 138 secured at one end to the arm 136, and at its other end to an arm 140 extending from the lower end 92 of the index element 46.

The recorder is designed to not only disclose the rise in temperature during a particular heating cycle and record the same, but also to terminate the operation at a predetermined temperature, the latter being indicated by the position of the element 48. The recorder is used in conjunction with controlling the period of sterilization in a sterilizing chamber heated by injecting steam. The thermal motor 60, which is connected by a tube 61 (FIG. 10) to the chamber, expands in response to the rise in temperature and operates to rock the lever Lo, and through the bar 80 and pinion 86 rotate the drive shaft 84 so as to move the indicator 46 up the scale. Similarly, the pen 50 is caused to travel relative to the chart to record the temperature thereon. The period of sterilization and the temperature at which sterilization is carried out is controlled by switches $S^1$ and $S^2$ which are brought into operation through movement of the rack bar 80. Switches $S^1$ and $S^2$ are secured to a rocker 146. The rocker 146 is pivotally supported on a shaft 144, the latter being supported in a bearing secured to the base plate. The rocker has right-angularly disposed arms 150 and 152 comprised of spaced parallel L-shaped plates 148. The switch $S^1$ is disposed between the horizontal arms of the plates 148—148 so that its actuating pin 163 is above the bar 80, and the switch $S^2$ is disposed between the vertical arms of the plates 148—148. Channel-shaped covers 151 and 153 are mounted between the plates 148—148 over the switches $S^1$ and $S^2$ and in spaced relation thereto, to protect them and to provide a covering for attachment of conductors 158 and 160. The arms, switches and covers are secured together by screw bolts 154 and 156. The plates 148—148 have, at the intersection of their legs, webs 158 and a pivot shaft 160 is supported therebetween and, in turn, supports an L-shaped lever with its legs 162 and 164 opposite the legs of the rocker, with the leg 162 interposed between the switch pin 163 and the upper end of the bar 80, and with the leg 164 opposite the switch pin 168 of the switch $S^2$. The arm 164 contains a threaded opening concentric with the switch pin 168 into which is threaded an adjusting screw 170. A coiled spring 172 is connected at one end to the arm 164 and at its other end to the rocker arm and normally operates to hold the adjusting screw 170 engaged with the switch pin 168 and, at the same time, to hold the arm 162 out of contact with the switch pin 163.

A cam ring 180 (FIGS. 3 and 4) is rotatably mounted on the plate 83 with an edge bearing against the underside of one of the horizontal legs of the rocker. The lower end of the element 48 is secured by screw bolts 183 to the ring. The upper portion of the element 48 is situated behind the scale plate 44 and has a hook 184 which extends forwardly over the upper edge of the plate 44, downwardly over the forward face thereof and is provided with a forwardly projecting, horizontal pin 186 which may be grasped to manually move the element 48 along the scale plate 44. Such movement rotates the cam ring and this, in turn, rocks the rocker on its shaft to change the position of the switch pin 163 relative to the bar 80 and hence the temperature at which the cycle will be initiated and maintained. A spring 188, provided with a hook at one end for engagement with a notched lug 189 on the rocker, and secured at its other end to the base plate, yieldably holds the horizontal arm of the plate 148 engaged with the cam ring.

In accordance with the operation, a timer T (FIG. 10) is manually set for a predetermined length of time. Setting of the timer closes the main switch $S_o$, supplying current through the switch $S^1$, which is normally closed, to a solenoid-operated steam valve SV, permitting steam to enter the sterilizing chamber SC,—it being understood, of course, that this chamber has previously been prepared for operation by evacuating it, for example, by means of a vacuum pump VP and then provided with a suitable sterilizing medium. As the temperature in the sterilizing chamber rises, the motor 60, as previously explained, effects rotation of the indicator 46 along the scale and, in accordance with the rocker carrying the switches, the latter will be rocked to initiate the timing cycle. For example, if a predetermined temperature of 250° F. is selected, when the indicator 46 reaches 250° on the scale, the switch $S^2$, which is normally opened, will be actuated to start the timer T. Simultaneously, the switch $S^1$ will be closed, thus to cut off the steam to the sterilizing chamber. Regulation of the temperature within the steam chamber is controlled by oscillation of the rocker which alternately turns off the timer T and permits additional steam to be injected and vice versa, thereby maintaining the cycle at a constant temperature for the desired time. When the period of sterilization is completed, the timer T, by opening the switch $S_o$ in the main circuit, shuts off the entire system, and as the expansible element in the motor 60 contracts, the indicator 46 is moved down the scale toward its initial position by the spring 85.

It is important to insure that evacuation of the sterilization chamber is complete before injecting the sterilizing medium and to plainly indicate this to the operator in such fashion that there is no question in his mind but what complete evacuation was effected before the sterilizing cycle was begun. The invention, as herein illustrated, is concerned with provision of means for use in combination with the recorder, as herein described, visibly to show the operator on the chart, by tracing of a line thereon, that the steam chamber was completely evacuated before the sterilizing medium was injected and the sterilizing cycle initiated. This is accomplished herein by intercepting the indicator 46 during its return movement toward its zero position as determined by a limit stop 189 (FIG. 4) at the end of each cycle of operation and holding it in this position until the beginning of the next cycle whereupon the indicator 46 is allowed to move from the point of interception into engagement with the stop 189 thereby to draw a line on the chart, showing that the chamber was at a predetermined vacuum at the beginning of the cycle of operation. To this end, a relay 190, supported by a frame 192, is secured to the back plate 52 (FIGS. 3, 4 and 9). A hinge plate 194, containing at its upper end notches 196, is pivotally supported between spaced arms 198—198 at the forward end of the top of the bracket 192. The hinge plate has an upstanding neck 200 which extends through an opening in a bracket member 202 fastened to the bracket 192, about which is looped one end of a coiled spring 206. The other end of the spring is looped about a finger 204 of the bracket 202. An arm 210 is secured to the front face of the hinge plate 194 and extends downwardly therefrom behind the indicator 46, the lower portion being provided with a forwardly projecting limb 211. Normally, when the solenoid is unenergized, the spring 206 holds the arm 210 at an angle, that is, inclined forwardly, so that the limb 211 lies in the path of movement of the indicator 46. The relay 190 has a pole 208 which, when energized by supplying current to the relay, pulls the plate 194 rearwardly which, in turn, moves the limb 211 out of the path of the indicator. The presence of the limb 211 in the path of the indicator will prevent the indicator from returning to its zero position against the stop 180, while its removal will permit the indicator to return to zero. The relay 190 is energized by a pulse-producing switch $S^3$, operation of which may be conveniently effected by a pressure-responsive diaphragm $d$ in a vacuum valve $V^2$ secured in a wall of the sterilizing chamber SC. As thus provided, when a suitable vacuum is secured by means of the pump VP, the diaphragm $d$ will be displaced in a manner to pulse the switch $S^3$ thereby to momentarily energize the relay 190. This, as previously stated, pulls the arm 210 and hence the limb 211 out of the path of the indicator 46 and allows the latter to be moved into contact with the stop 189. Since the relay 190 is given only a pulse it immediately deenergizes thereby releasing the arm 210 so that the latter is pulled forwardly by the spring 206, pressing a second limb 213, extending downwardly from the limb 211, against the rear side of the indicator 46 so as to frictionally retard its fall and hence to prevent bounce. The return movement of the indicator from the intercepted position to its initial position will, of course, cause the pen to trace a short distinctive line on the chart so that it is easy to see, by reference to the chart, whether the desired vacuum was effected prior to the beginning of each cycle of operation.

Operation takes place as follows: At the beginning of any cycle the indicator 46 rests against the limb 211, the latter being held in a forwardly displaced position by the spring 206. The timer T is in a zero position and the main switch $S_o$ is open. The operator starts the vacuum pump VP and evacuates the sterilizing chamber SC the desired amount. When this vacuum is attained the pressure-sensitive diaphragm $d$ pulses the switch $S^3$ which energizes the relay 190 to retract the arm 210 and hence the limb 211 thereby to release the indicator 46. Since the temperature is substantially at room level, the motor 60 operates to pull the rod 80 down and hence allow the indicator to move into contact with the stop 189. Since the pulsing of the relay 190 is momentary, the latter releases the arm 210 and the spring 206 promptly tilts the arm 210 forwardly so that the limb 213 frictionally engages the rear side of the indicator, preventing it from striking the stop with sufficient force as to cause damage or bounce. Movement of the indicator through the rod 138 causes the pen arm to move over the face of the chart and, by means of the nib, trace a line thereof. Now the operator manually rotates the timer T to set the cycle for a predetermined period of operation. Setting the timer closes the main switch $So$, supplying current to the chart motor M and the switches $S^1$ and $S^2$. Since the switch $S^2$ is normally closed, it energizes a solenoid-operated valve SV in a steam line to permit steam to enter the sterilizing chamber SC. As the temperature rises in the sterilizing chamber the expandable element, that is, the thermal motor 60 expands, raises the rod 80, rotates the indicator 46 up the chart, and rocks the rocker 146. When the indicator reaches the temperature set by the element 148 which, as previously explained, adjusts the height of the switch $S^1$ with respect to the rod 80, the arm 164 on the rocker disengages the switch pin 168 of the switch $S^2$ thus energizing the timer T so that the cycle commences and, at the same time, engages the switch pin 163 of the switch $S^1$ to close the steam valve SV. As the cycle proceeds the arms 162 and 164 are oscillated alternately to shut off the steam and turn on the timer and to turn on the steam and shut off the timer thereby to maintain a constant temperature of sterilization throughout the period of operation. When the end of the period is reached the timer T opens the main switch, shutting down the apparatus by cutting off current to the chart motor M and the switches $S^1$ and $S^2$. Now the indicator 46 moves back toward the stop 189, but since the arm 210 is held forwardly by the spring 206, it is intercepted by the limb 211 and will remain in this position until the next cycle is initiated by first evacuating the sterilizing chamber the proper amount.

It should be understood that the present disclosure is for the purpose of illustration only and that this invention includes all modifications and equivalents which fall within the scope of the appended claims.

We claim:

1. Recording apparatus for use in a sterilizing chamber which must be evacuated to a predetermined low level prior to operation, comprising evacuating means connected to the chamber to effect evacuation thereof, means for injecting a sterilizing medium into the chamber, means for heating the chamber, a timer operable to initiate heating, a recorder having a scale on which there is a reference, an indicator movable along the scale from said reference in response to heating of the chamber to indicate the rise in temperature within the chamber, a thermal element responsive to the rise in temperature in the chamber to effect movement of the indicator along the scale, a pair of switches, means movable with the indicator operable, when the indicator reaches a predetermined high temperature, to actuate one switch to initiate operation of the timer and the other switch to terminate heating, said last means being movable by fluctuation of the thermal element in response to fluctuation of the temperature in the chamber to stop the timer and initiate heating and to terminate heating and restart the timer thereby to effect heating for a predetermined period at a predetermined temperature, a chart having on it a reference corresponding to the reference on the scale, a scriber movable on the chart, means connecting the indicator and scriber so that the scriber traces a line on the chart corresponding to the movement of the indicator on the scale, an arm supported adjacent the indicator, said arm yieldably engaging the indicator at said reference, said arm being movable to a position between the reference and the indicator when the latter moves up the scale and in such position intercepting the indicator as it returns toward said reference following termination of operation by the timer, and vacuum-responsive means operable by evacuation of the chamber to said predetermined low level preparatory to the next operation to retract said arm sufficiently to permit the indicator to be pulled back to said reference, said arm by movement from said position of interception permitting the indicator to return to said reference, and said indicator by said return causing the scriber to trace a line on the chart indicative of said return.

2. Heat-treating apparatus embodying a heat-treating chamber for carrying out a heat-treating operation, wherein the heat-treating chamber requires evacuation to a predetermined low pressure prior to the commencing of the heat-treating operation, vacuum-producing means for effecting evacuation of the chamber, means for recording whether or not said chamber has been evacuated to said predetermined low pressure prior to initiation of the heat-treating operation, comprising a recorder having a scale with a reference on it, an indicator movable along the scale away from the reference as the operation continues, means operable to effect movement of the indicator as the operation proceeds, means urging the indicator to return to said reference at the end of the operation, a device biased to move to a position as the indicator moves away from said reference to prevent return of said indicator to said reference until the chamber is again evacuated to said predetermined low pressure, a chart having a reference on it corresponding to that on the scale, a scriber arranged to move along the chart, means connecting the indicator and scriber so that the scriber makes a tracing on the chart corresponding to the movement of the indicator, and power-operable means connected to the device operable to withdraw it from the path of the indicator and then release it, operation of said power-operable means being initiated by evacuation of the chamber to said predetermined pressure.

3. Heat-treating apparatus embodying a heat-treating chamber for carrying out a heat-treating operation, wherein the heat-treating chamber requires that a predetermined pressure be established therein prior to commencing the heat-treating operation, means for inducing said pressure in said chamber, means for recording whether said pressure has been induced in said chamber prior to initiating a heat-treating operation, comprising a recorder having a scale with a reference on it, an indicator movable along the scale away from the reference as the operation proceeds, means operable to effect movement of the indicator as the operation proceeds, means urging the indicator to return to said reference at the end of the operation, a device movable to a position as the indicator moves away from said reference to prevent return of said indicator to said reference until the chamber is again at said predetermined pressure, a chart having a reference on it corresponding to that on the scale, a scriber arranged to move along the chart, means connecting the indicator and scriber so that the scriber makes a tracing on the chart corresponding to the movement of the indicator, said device comprising an arm pivotally supported at its upper end rearwardly of the indicator in the path of movement thereof, said arm being movable forwardly to intercept the path of movement, spring means urging said arm forwardly, a relay operably connected to the arm to pull it rearwardly to a non-intercepting position and then release it, and pressure-responsive means operable when the chamber is restored to said predetermined pressure to pulse said relay.

4. The combination of an apparatus embodying means for initiating a cycle of operation and for terminating said cycle of operation, means for establishing a predetermined condition of the apparatus prior to commencing a cycle of operation so that each operation starts from the same predetermined initial condition, means for indicating whether or not said predetermined initial condition was established at the initiation of each cycle of operation, comprising a recorder operably connected to the apparatus operable, as the operation proceeds, to indicate the progress of the operation, said indicator having a scale with a reference on it indicative of said predetermined initial condition, an indicator movable along the scale relative to said reference as the operation proceeds to indicate the progress of the operation, means urging the indicator to return to said reference at the end of a cycle of operation, a device associated with the recorder movable to a position, when the indicator has moved away from said reference, to prevent its return to said reference until said predetermined initial condition is reestablished, a chart having on it a reference corresponding to that on the scale, a scriber arranged to move along the chart relative to said reference, means connecting the indicator to the scriber so that the scriber makes a tracing on the chart corresponding to the movement of the indicator, power-operable means for retracting said device, and means responsive to the establishment of said predetermined initial condition of the apparatus at the beginning of any cycle of operation to effect retraction of said device so that the indicator moves back to said reference and said scriber is moved thereby to make a tracing on the chart indicative of the movement of the indicator from its position of interception at the end of a preceding operation back to said reference.

References Cited

UNITED STATES PATENTS 2,208,552  7/1940  Walter _____ 21—98
3,216,019  11/1965  Melton et al. _____ 346—30

JAMES H. TAYMAN, JR. *Primary Examiner.*